US011539412B2

(12) United States Patent
Tofighbakhsh et al.

(10) Patent No.: US 11,539,412 B2
(45) Date of Patent: Dec. 27, 2022

(54) BEAM RECOVERY FOR ANTENNA ARRAY

(71) Applicant: AT & T Intellectual Property I, L.P., Atlanta, GA (US)

(72) Inventors: Mostafa Tofighbakhsh, Cupertino, CA (US); Rittwik Jana, Montville, NJ (US); Bogdan Ungureanu, Holmdel, NJ (US); Deva-Datta Sharma, San Ramon, CA (US); Shraboni Jana, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 68 days.

(21) Appl. No.: 16/526,828

(22) Filed: Jul. 30, 2019

(65) Prior Publication Data

US 2021/0036752 A1 Feb. 4, 2021

(51) Int. Cl.
*H04B 7/06* (2006.01)
*H04B 17/318* (2015.01)
*H04W 16/28* (2009.01)

(52) U.S. Cl.
CPC ......... *H04B 7/0617* (2013.01); *H04B 17/318* (2015.01); *H04W 16/28* (2013.01)

(58) Field of Classification Search
CPC .... H04B 7/0617; H04B 17/318; H04W 16/28
See application file for complete search history.

(56) References Cited

U.S. PATENT DOCUMENTS

| | | | | |
|---|---|---|---|---|
| 9,568,590 | B1* | 2/2017 | Haupt | H01Q 3/2617 |
| 10,607,500 | B1* | 3/2020 | Rakshit | G06F 16/9035 |
| 2005/0206564 | A1* | 9/2005 | Mao | H01Q 3/2682 |
| | | | | 342/377 |
| 2006/0245512 | A1* | 11/2006 | Rha | H04L 1/203 |
| | | | | 375/267 |
| 2010/0202434 | A1* | 8/2010 | Wu | H04W 8/005 |
| | | | | 370/345 |
| 2010/0297947 | A1* | 11/2010 | Rofougaran | H04B 7/0682 |
| | | | | 455/63.1 |
| 2015/0188620 | A1* | 7/2015 | Ponnuswamy | H04B 7/10 |
| | | | | 375/267 |
| 2016/0352012 | A1* | 12/2016 | Foo | H04B 7/0452 |
| 2017/0013534 | A1* | 1/2017 | Bellis | H04W 40/16 |
| 2018/0279134 | A1* | 9/2018 | Malik | H04B 7/063 |

(Continued)

OTHER PUBLICATIONS

"What is Beamforming?" Wade4Wireless [https://wade4wireless.com/2018/01/08/what-is-beamforming/], dated Jan. 8, 2018, retrieved Dec. 6, 2020, 10 pages.

(Continued)

*Primary Examiner* — Brenda H Pham

(74) *Attorney, Agent, or Firm* — Amin, Turocy & Watson, LLP

(57) ABSTRACT

The described technology is generally directed towards beam recovery for an antenna array. One or more recovery beams or recovery beam patterns can be defined for an antenna array, and in response to a failure, the antenna array can be restored to a defined recovery beam or recovery beam pattern. Techniques for defining recovery beams and recovery beam patterns for the antenna array, selecting a recovery beam or recovery beam pattern for the antenna array, and entering a selected recovery beam or recovery beam pattern by the antenna array are also disclosed.

20 Claims, 8 Drawing Sheets

(56) References Cited

U.S. PATENT DOCUMENTS

2019/0393601 A1\* 12/2019 Logothetis ........... H04B 7/0617
2020/0037332 A1\* 1/2020 da Silva .............. H04W 72/085

OTHER PUBLICATIONS

"What is FD-MIMO" ShareTechNote [https://www.sharetechnote.com/html/5G/5G_MassiveMIMO_FD_MIMO.html] retrieved Dec. 6, 2020, 5 pages.

Suarez et al. "DFT based Beam-Time Delay Sparse Channel Representation for Channel State Information (CSI) Compression in 5G FDD Massive MIMO Systems" 2018 IEEE International Black Sea Conference on Communications and Networking (BlackSeaCom), Jun. 2018, 6 pages.

Rozé et al. "Millimeter-Wave Digital Beamsteering in Highly Line-of-Sight Environments for Massive MIMO Systems" Forum WWRF35, Copenhagen, Denmark, Oct. 2015, 6 pages.

\* cited by examiner

BEAM RECOVERY FOR ANTENNA ARRAY

TECHNICAL FIELD

The subject application is related to wireless communication systems, and, for example, to beamforming antenna arrays deployed in wireless communication networks.

BACKGROUND

Beamforming antenna arrays will play an important role in the emerging fifth generation (5G) wireless communications. Beamforming antenna arrays generally include multiple antenna elements which can be controlled to direct radio waves in desired directions.

Beamforming capabilities will increase the capacity of cellular networks by improving the signal to interference ratio (SIR) through direct targeting of user groups. Beams will also lower the amount of interference in the radio environment, and make it possible to maintain signal power at larger distances.

However, the use of beamforming antenna arrays increases the complexity of wireless communications, and many technical challenges remain. One challenge is the problem of recovering from failures in beam communications. Technologies are needed to efficiently and reliably recover from such failures under a range of circumstances which may be encountered by real world 5G implementations.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
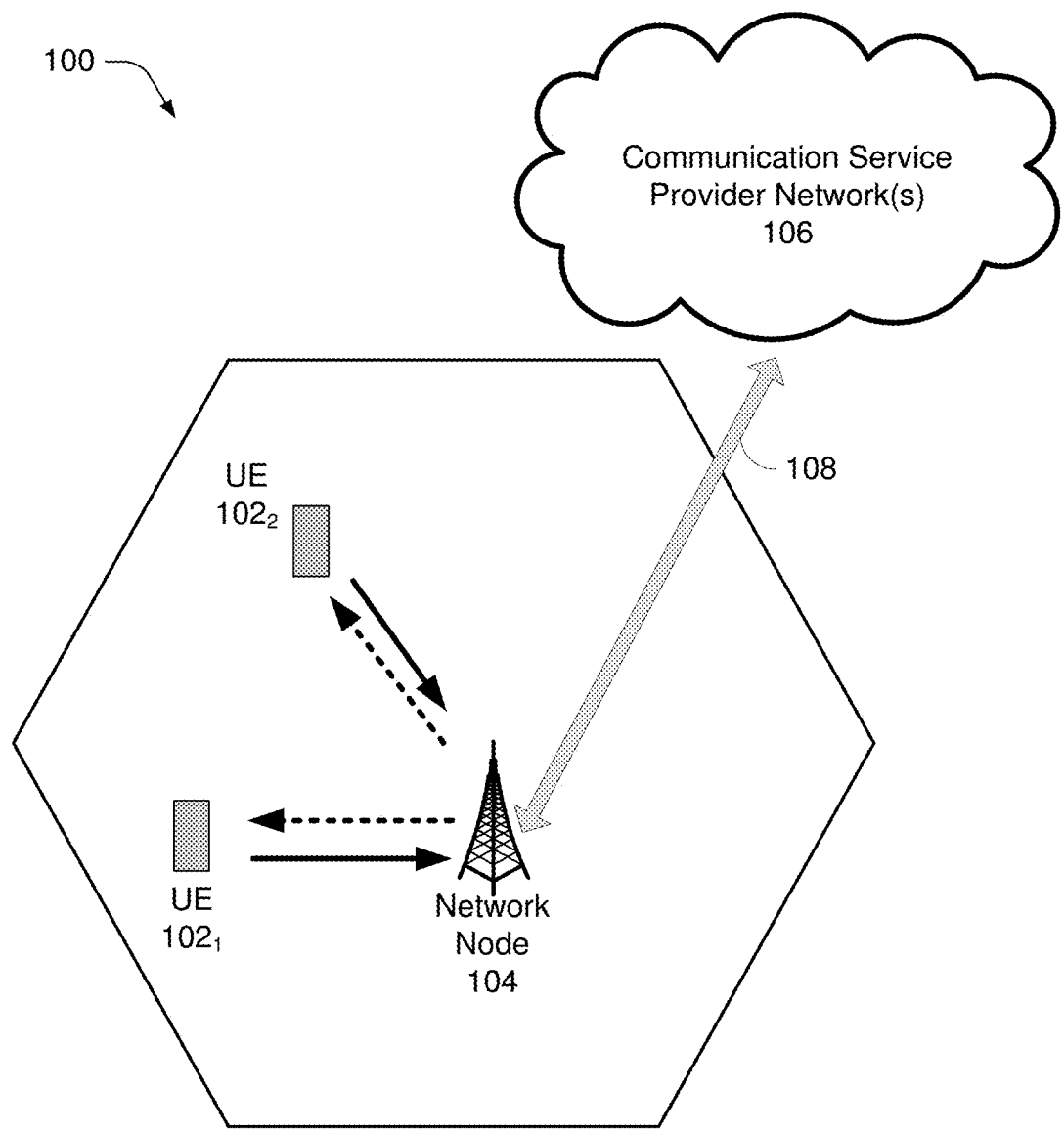
FIG. 1 illustrates a non-limiting example of a wireless communication system, in accordance with various aspects and implementations of the subject disclosure.

One or more aspects of the technology described herein are generally directed towards beam recovery for an antenna array. One or more recovery beams or recovery beam patterns can be defined for an antenna array, and in response to a failure, the antenna array can be restored to the defined recovery beam or recovery beam pattern. Techniques for defining recovery beams and recovery beam patterns for the antenna array, selecting a recovery beam or recovery beam pattern for the antenna array, and entering a selected recovery beam or recovery beam pattern by the antenna array are also disclosed.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). The antennas at network node 104 can be arranged in a controllable antenna array, which can produce any desired beam patterns, as described further in connection with FIG. 2, FIG. 3, FIG. 4, and FIG. 5. Network node 104 can comprise a "base station" and one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications. In some embodiments, the UL communications can include channel state information (CSI), which generally provides network node 104 and communication service provider networks 106 with information about signal strength at UEs 102.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-Spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
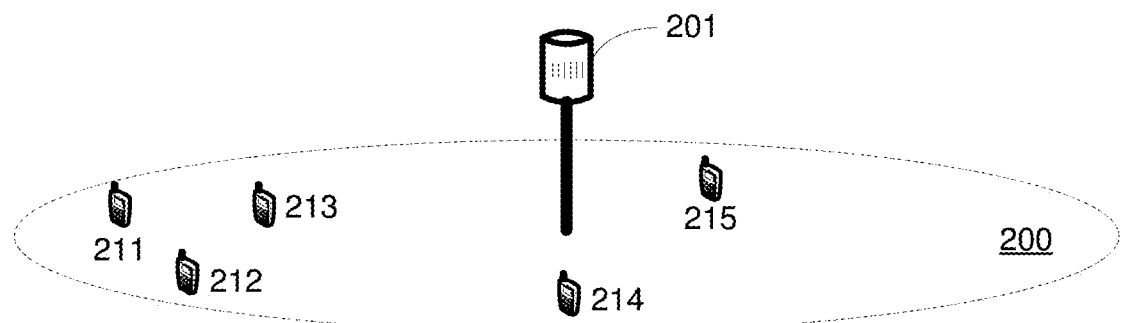
FIG. 2 illustrates an example antenna array and a distribution of UEs serviced by the antenna array, in accordance with various aspects and implementations of the subject disclosure.

FIG. 2 illustrates an example antenna array and a distribution of UEs serviced by the antenna array, in accordance with various aspects and implementations of the subject disclosure. Repetitive description of like elements employed in other embodiments described herein is omitted for sake of brevity. Example antenna array 201 can be part of a network node 104 shown in FIG. 1. Example UEs 211, 212, 213, 214, and 215 can be examples of UEs 102 illustrated in FIG. 1. The antenna array 201 can provide wireless communication services to UEs in the service area 200. As will be described further in connection with FIG. 3, FIG. 4, and FIG. 5, antenna elements of antenna array 201 can be controlled to produce any desired beams and beam patterns. Some beam patterns can provide strong signals for UEs 211, 212, 213, 214, and 215, while other beam patterns may not. As the UEs 211, 212, 213, 214, and 215 move, the beams and beam patterns produced at antenna array 201 can be recalculated to maintain signal strength for some or all of the UEs 211, 212, 213, 214, and 215.

Figure 3:
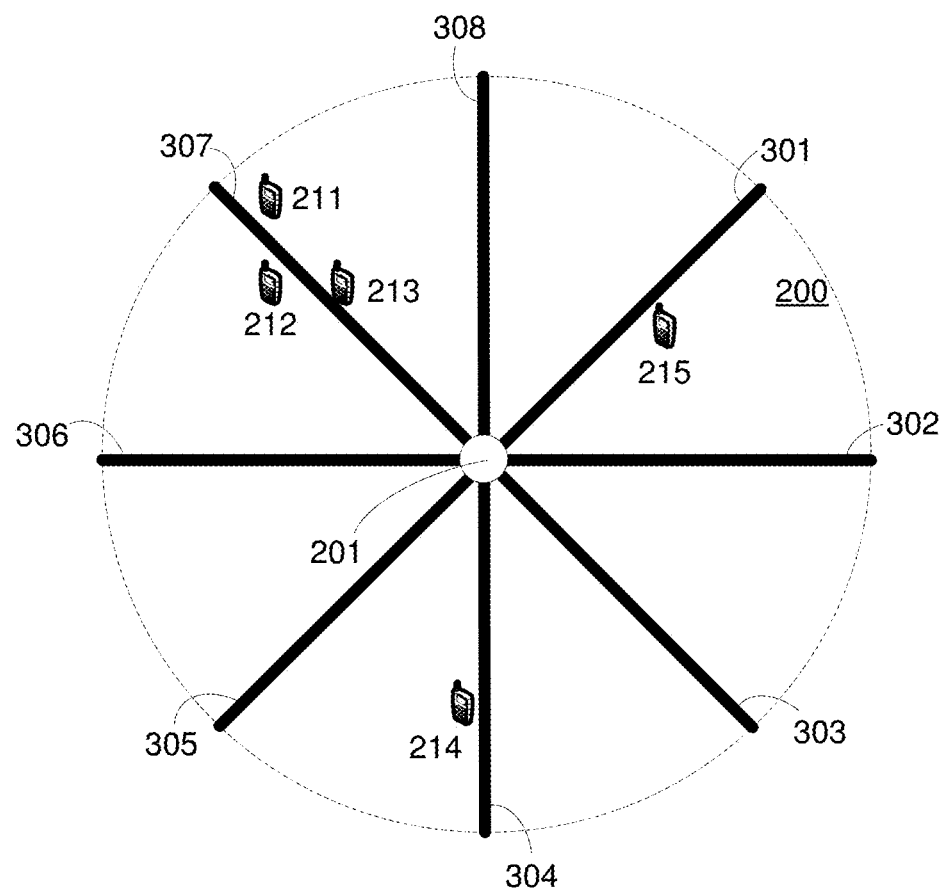
FIG. 3 illustrates an example beam pattern produced by an antenna array and a distribution of UEs serviced by the antenna array, in accordance with various aspects and implementations of the subject disclosure.

FIG. 3 illustrates an example beam pattern produced by an antenna array and a distribution of UEs serviced by the antenna array, in accordance with various aspects and implementations of the subject disclosure. Repetitive description of like elements employed in other embodiments described herein is omitted for sake of brevity. FIG. 3 provides a top view of the antenna array 201, the UEs 211, 212, 213, 214, and 215, and the service area 200 illustrated in FIG. 2. FIG. 3 furthermore illustrates multiple beams 301, 302, 303, 304, 405, 306, 307, and 308 indicated by bold black lines extending radially from the antenna array 201. Collectively, the beams 301, 302, 303, 304, 405, 306, 307, and 308 form a beam pattern.

It will be understood that beams 301, 302, 303, 304, 405, 306, 307, and 308 generally comprise zones of constructive interference of radio frequency signals generated at antenna array 201. UEs 211, 212, 213, 214, and 215 will generally experience good signal reception when UEs 211, 212, 213, 214, and 215 are near any of the beams 301, 302, 303, 304, 405, 306, 307, and 308. Conversely, zones of destructive interference of radio frequency signals generated at antenna array 201 are present in the white space between beams 301, 302, 303, 304, 405, 306, 307, and 308. UEs 211, 212, 213, 214, and 215 will generally experience poor signal reception when in the troughs, or zones of destructive interference.

A network node 104 can control antenna array 201 to produce any desired beam pattern. In some embodiments, network node 104 can calculate individual beams 301, 302, 303, 304, 405, 306, 307, 308 and/or a beam pattern, and network node 104 can adjust relative phases of individual antenna elements within the antenna array 201 in order to produce the calculated beams and/or beam pattern. This disclosure is not limited to any particular beam forming technique.

To provide strong signals for UEs 211, 212, 213, 214, and 215, a beam pattern that places beams 301, 302, 303, 304, 405, 306, 307, and 308 near UEs 211, 212, 213, 214, and 215 is desired. FIG. 3 shows one example beam pattern that places beams from the beam pattern comprising beams 301, 302, 303, 304, 405, 306, 307, and 308 near UEs 211, 212, 213, 214, and 215, however other beam patterns may also suffice for the spatial distribution of UEs illustrated in FIG. 3. Furthermore, as UEs 211, 212, 213, 214, and 215 move, new beams or beam patterns can be used to continue to provide strong signals for UEs 211, 212, 213, 214, and 215.

In the event of a failure at antenna array 201, aspects of this disclosure provide techniques to speed up recovery of antenna array 201 to thereby restore service to UEs 211, 212, 213, 214, and 215. In some embodiments, one or more recovery beams and/or recovery beam patterns can be defined for antenna array 201. Recovery beams can be used to restore service to a single UE, e.g., UE 214, or multiple UEs, e.g., UEs 211, 212, and 213. In some embodiments, the recovery beams and recovery beam patterns can have a higher probability of initially providing strong signals for as many of UEs 211, 212, 213, 214, and 215 as possible. In response to a failure, the antenna array 201 can return to a defined recovery beam or recovery beam pattern.

Figure 4:
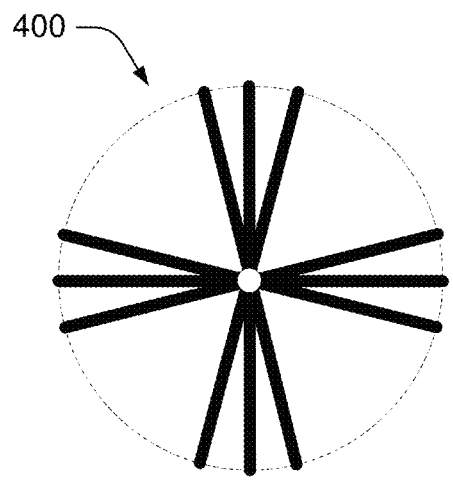
FIG. 4 illustrates an example recovery beam pattern, in accordance with various aspects and implementations of the subject disclosure.
Figure 5:
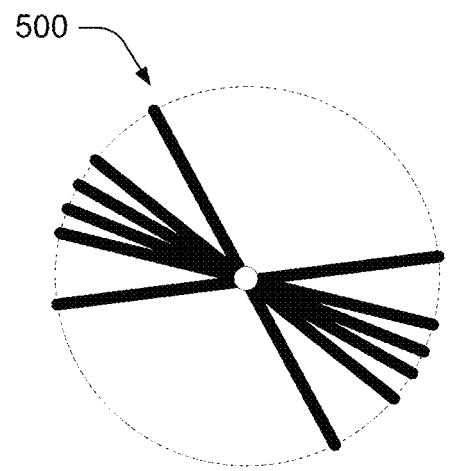
FIG. 5 illustrates another example recovery beam pattern, in accordance with various aspects and implementations of the subject disclosure.

Any beam pattern can optionally be used as a recovery beam pattern. The beam pattern illustrated in FIG. 3 can thus serve as one possible recovery beam pattern. FIG. 4 and FIG. 5 provide additional example beam patterns which can be used as recovery beam patterns in some embodiments.

FIG. 4 illustrates an example recovery beam pattern, in accordance with various aspects and implementations of the subject disclosure. Repetitive description of like elements employed in other embodiments described herein is omitted for sake of brevity. FIG. 4 provides a top view of a network node comprising an antenna array and a service area such as illustrated in FIG. 2, and a beam pattern 400 comprising beams indicated by bold black lines extending radially from the antenna array.

FIG. 5 illustrates another example recovery beam pattern, in accordance with various aspects and implementations of the subject disclosure. Repetitive description of like elements employed in other embodiments described herein is omitted for sake of brevity. FIG. 5 provides a top view of a network node comprising an antenna array and a service area such as illustrated in FIG. 2, and a beam pattern 500 comprising beams indicated by bold black lines extending radially from the antenna array.

As can be seen in FIG. 4 and FIG. 5, beam patterns can include beams spaced at regular or irregular intervals, and beam patterns can be symmetrical or non-symmetrical. In general, a wide variety of beam patterns are possible and this disclosure is not limited to the use of any particular beam patterns or classes of beam patterns.

In an aspect of this disclosure, a solution for recovering from a 5G beam failure is provided. In 5G, the connection between a UE and the radio unit (RU) on a network node 104 is in the form of a beam. A failed beam (a connection disruption between UE and RU) can generally be detected and restored in a few seconds. However, 5G use cases require very high speeds (data throughput) at very low latencies (milliseconds). For such use cases, especially those that are mission and safety critical (e.g., FirstNet), any disruption in beam or degradation of its performance is undesirable. Even though these disruptions can be recovered and on the average the 5G Radio Access Network (RAN) is more reliable than previous generation communication standards, for an individual UE, the disruption compromises the quality of the service. Therefore this disclosure provides an approach to further speed up beam recovery in 5G.

Some embodiments can incorporate Artificial Intelligence (AI), Machine Learning (ML) or other analytics procedures to offer the UE a recovery beam as soon as (or even before) a beam failure happens. Embodiments can optionally minimize the time required to detect a beam failure and re-establish the communication between the UE and the 5G RAN. UEs can continually measure and report channel state information (CSI), which represents known channel properties of a communication link to the gNB/eNB radios on a network node 104. Monitoring CSI enables anticipation and detection of beam failures. A pre-calculated atomic set of recovery beam patterns (such as grouped phased arrays) can be established to meet recovery requirements. For example, a group of antenna array 201 radios can be instructed to switch to a given recovery beam pattern (ID-x) atomically and from there the reactive modes at each independent radio unit can converge to an optimal beam pattern.

In massive MIMO techniques in 5G and beyond, more transmitters and receivers send and receive data simultaneously at the radio antenna. Due to more antennas being available (and controllable individually or as an array), beams can be more optimally formed to increase coverage, capacity and spectrum utilization. Moreover, 5G use cases envision very high numbers of UEs in a given area; this too increases the number of transmitters and receivers participating in data transfer.

Massive MIMO approaches can include the use of pilots or pilot beams, which are pre-defined reference signals that are transmitted to let the receiver estimate channel attributes. Pilots can be issued by UEs and received by a massive MIMO RU on a network node 104. To achieve better spectral efficiency, it is desired to have beam patterns that serve more UEs. Thus a combination of pilots from all the UEs in an area (specially, in 5G densified deployment) along with continuous refinement of beam patterns can be provided.

Failure or disruption of a beam can happen for numerous reasons, such as network node failure, hacker attacks against the RAN, beam splitting, external conditions (such as weather, structures, geographical features, etc.), and interrupting the beam (5G mmWave beams are blocked even by a human body). Beam failure scenarios can include, e.g., failure of a beam serving a single UE, failure of a beam serving a cluster of UEs, and failure due to a hacker/jammer attack.

In scenarios involving failure of a beam serving a single UE, prior recovery techniques involved the UE, e.g., UE 214 in FIG. 2, initially sending a pilot signal to the RU on a network node 104, and then using normal processing to establish an optimal beam. This process can be repeated for each individual UE even if there are a group of UE's in a cluster/cell. Upon a failure/degradation of a beam, the connection may drop, and the process would repeat to re-establish the beam. This "reactive response" can take seconds and thus degrade the user experience and latency sensitive services.

Embodiments of this disclosure can address the failure of a beam serving a single UE, e.g., beam 304 serving UE 214 as illustrated in FIG. 3, using any of multiple distinct approaches provided herein. These can be used alone or in combination in any sequence. In one approach, the failed/disrupted beam 304 can be adapted to define a recovery beam. When a beam is established, e.g., beam 304, the UE 214 can periodically send CSI to the RU/DU at network node 104 comprising antenna array 201. The CSI be can be continually monitored at the network node 104 or at the communication service provider network 106. Using monitoring data coupled with appropriate statistical/machine-learning analysis, a CSI-based "inference" can be made. This "inference" predicts beam failure or degradation in beam performance of beam 304. Based on the inference, a new set of beam pattern parameters can be computed for the recovery beam, and the parameters can be sent to DU/RU at network node 104 to adjust the beam 304 (using massive MIMO) to a more reliable and robust pattern.

In another approach, a set of recovery beams can be defined as a backup to a current beam: This approach is similar to using redundant systems to backup a primary system. Here the redundancy involves pre-computing recovery beams for a primary beam, e.g., multiple recovery beams can be pre-computed for beam 304. Given the parameters of an existing primary beam 304, recovery beam parameters can be precomputed corresponding to various anticipated failure modes. Since UEs can be mobile, the recovery beam parameters can be continually refreshed. Either upon a failure of beam 304 or based on CSI inferences (predictions of beam failure), the backup beam parameters can be sent to DU/RU at network node 104 to reconfigure the beam 304.

In another approach, a set of recovery beams can be precomputed that, given the location of a UE, e.g., UE 214, and its trajectory, take into account external factors (such as environment, structures, geographical features, etc.). In this approach, the failure modalities are expanded to include the influence of environmental objects (weather, structures, geographical features, etc.). 5G mmWave are known to have short ranges easily attenuated by environmental factors thus leading to beam failure.

Finally, if beam recovery by the above approaches fails, then the network node 104 and UE 214 can switch to 4G/LTE communications so as to maintain the coverage at a degraded level.

Embodiments of this disclosure can also address the failure of a beam that serves a cluster of UEs, such as beam 307 which serves UEs 211, 212, and 213. Often a failure of a beam is not limited to a single UE in a cell or region. Due to failures in massive MIMO elements or common environmental factors, a majority of UEs in a region can experience a beam failure. Detecting and resolving beam failures one beam, one UE at a time is inefficient and can degrade service by constantly requiring re-computation of beam parameters and reallocation of RU antenna resources. Embodiments of this disclosure can address this situation by applying, to situations involving multiple UEs 211, 212, 213, the techniques disclosed herein for failure of a beam serving a single UE 214, with the following extensions: recognize a cluster of UEs 211, 212, and 213 based on their location and CSI information; identify the beam 307 lobe that can optimally service all the UEs 211, 212, and 213 in the cluster; and apply approaches for failure of a beam 304 serving a single UE 214 to the entire beam lobe 307 of the cluster of UEs 211, 212, and 213, rather than a single UE 214.

In another aspect, some embodiments of this disclosure can address beam failures resulting from hacker/jammer attacks. As the number of MIMO channels increase, enabling narrower beams, there will be pilots that interfere with one another or fail. Moreover, contamination can also be established by an attacker to purposely interfere with data transfers. Assume some attacker can generate the exact same pilot sequences as those of the legitimate users and transmit these sequences to distort the channel estimation at the base station, which ultimately reduces the data transmission rate to valid users. In such circumstances, an antenna array 201 can be switched to a recovery beam pattern that deliberately excludes or jails the attacker, by placing the attacker in a trough (an area of destructive interference) or in a "jailed" beam. Traffic initiated at a jailed beam can be tagged for further actions by the rest of the user planes including mitigation for security violations.

Figure 6:
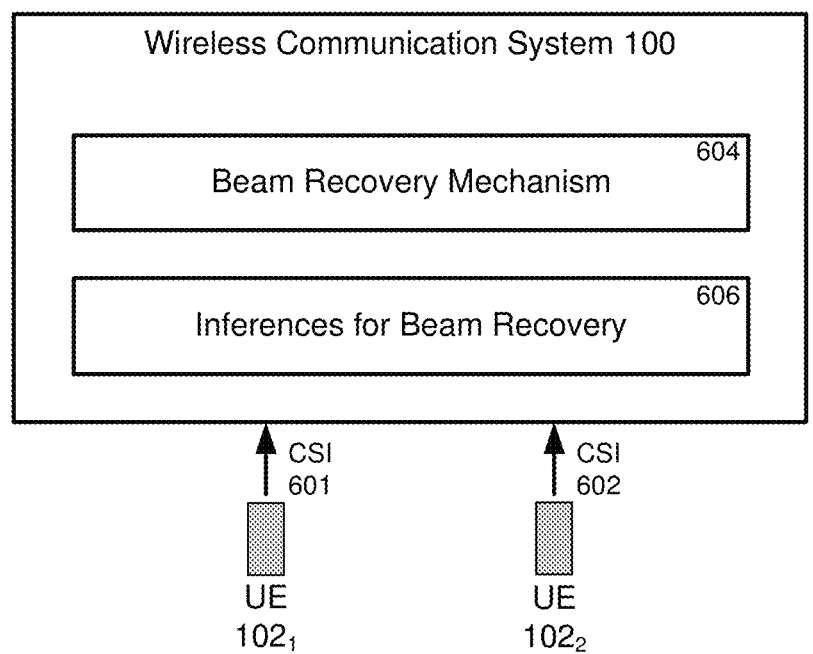
FIG. 6 is a block diagram illustrating example beam recovery components of a wireless communication system, in accordance with various aspects and implementations of the subject disclosure.

FIG. 6 is a block diagram illustrating example beam recovery components of a wireless communication system, in accordance with various aspects and implementations of the subject disclosure. Repetitive description of like elements employed in other embodiments described herein is omitted for sake of brevity. FIG. 6 includes the wireless communication system 100 introduced in FIG. 1, wherein wireless communication system 100 comprises a beam recovery mechanism 604 and an inferences for beam recovery component 606. FIG. 6 furthermore illustrates UEs 1021 and 1022, which can send CSI 601 and 602 to the wireless communication system 100.

In some embodiments, beam recovery mechanism 604 can comprise a centralized proactive mechanism with an objective of identifying beam failures and defining recovery beams or recovery beam patterns to mitigate the beam failures. Beam recovery mechanism 604 can optionally comprise part of a RAN intelligent controller (RIC) included in the wireless communication system 100. Beam recovery mechanism 604 can be aware of historical, current and predicted distributions of CSIs (optionally including CQI—Channel Quality Indicator & PMI—Precoding Matrix Indicator) for a geographical region at any given time. Based on these CSI observations, in conjunction with current and historical RAN and UE states, the beam recovery mechanism 604 can infer the following example policies: (1) beam recovery is not required; and (2) beam recovery is required.

In addition, the beam recovery mechanism 604 can intelligently classify beam failure causes. For example, the beam recovery mechanism 604 can classify beam failures into one of the following categories: (a) antenna array element(s) failure; and (b) jamming signal by an attacker UE. Causes of failure can be ascertained using the following example information: CSI (Channel State Information) Inferences; UE distribution Geographical Layout; RU constraints and capabilities, RRC Signaling.

On detection of a failure, and determination of the cause of failure, the beam recovery mechanism 604 can determine a set of recovery beam parameters, or a recovery beam pattern, to mitigate failures within the policies specified by the service provider. The determined set of recovery beam parameters/patterns can be selected from a pre-defined set of beam parameters or patterns, or can be computed based on statistical models with information of states from other layers of the wireless communication system 100.

In some embodiments, recovery beam patterns can be orchestrated/deployed by changing the following example parameters: azimuth angles of antenna array elements; elevation angles of antenna array elements; direction of beams; size of beams; beam weights for codebook (in case of digital beamforming).

Meanwhile, inferences for beam recovery 606 can make dynamic corrections of beam pattern parameters by continuous observations of states from other layers of the wireless communication system 100. For example, if the cause of a beam failure has been determined as "jamming signal by an attacker UE", inferences for beam recovery 606 can suggest beam patterns based on the set of "jailed beam patterns". Since jamming/DDoS attacks are generally executed by co-located UEs, the suggestive beam patterns for such UEs can be a weaker separate beam non-interfering with genuine users.

In another example, when the RIC of the wireless communication system 100 learns that a cell split recovery is needed, it can instruct the RAN components (including the relevant RUs) to switch to a base-line phase array inference that can provide relatively strong radio frequency signals for characterized recovery groupings (of UEs). The base line beam pattern for recovery inferences can help radios to adapt to the best transmission with the highest reliable radio beam pattern.

In an aspect, rapid beam, cell and UE recovery mechanisms for massive MIMO beam patterns such as those disclosed herein can serve many more users for each time and frequency interval efficiently. In addition, the RIC of the wireless communication system 100 can assist with spatial multiplexing to merge the UEs in coverage of "failed antenna array elements" into more energy efficient beams for seamless connectivity. As a result, we expect savings over RIC centric control of beams and cells and UE patterns especially when the failure is due to a sudden change.

Figure 7:
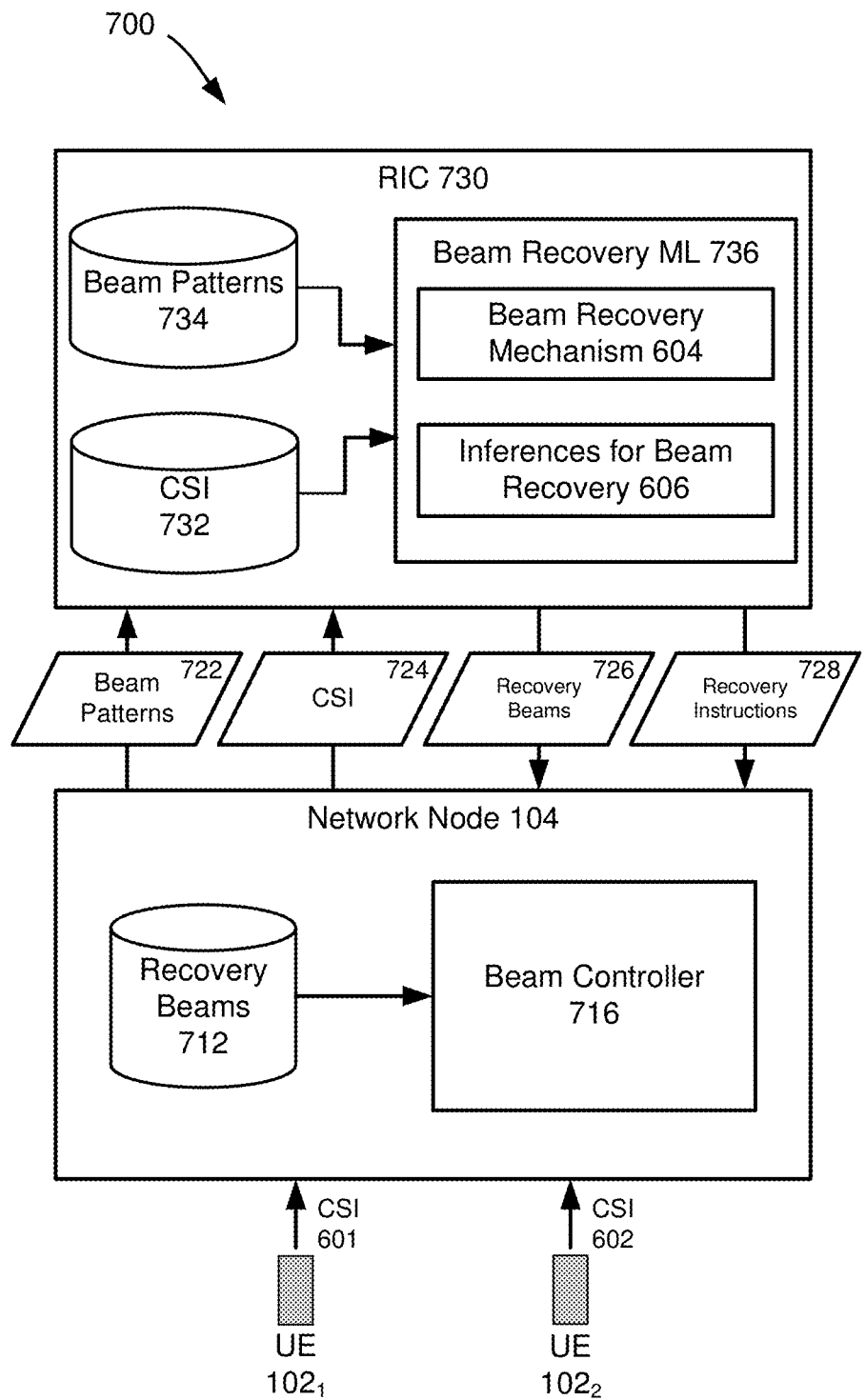
FIG. 7 is a block diagram illustrating an example arrangement of beam recovery components in a wireless communication system, in accordance with various aspects and implementations of the subject disclosure.

FIG. 7 is a block diagram illustrating an example arrangement of beam recovery components in a wireless communication system, in accordance with various aspects and implementations of the subject disclosure. Repetitive description of like elements employed in other embodiments described herein is omitted for sake of brevity. FIG. 7 includes a wireless communication system 700, which includes features described with reference to wireless communication system 100 introduced in FIG. 1. For example, wireless communication system 700 includes network node 104 and RIC 730, wherein RIC 730 can comprise a computing device in a communication service provider network 106. UEs 102 can communicate with network node 104. UEs 102 can receive signals from a beamforming antenna array such as 201, included in network node 104, and UEs 102 can send CSI 601, 602 to the network node 104.

In the example arrangement of FIG. 7, RIC 730 comprises beam patterns 734, CSI 732, and a beam recovery machine learning (ML) block 736. The beam recovery ML block 736 comprises beam recovery mechanism 604 and inferences for beam recovery 606, introduced in FIG. 6. Network node 104 comprises recovery beams 712 and beam controller 716. Beam patterns 722 and CSI 724 are illustrated as data sent from network node 104 to RIC 730. Recovery beams 726 and recovery instructions 728 are illustrated as data sent from RIC 730 to network node 104.

In some example operations of a wireless communication system 700, CSI 601, 602 can be received at network node 104, and optionally bundled and forwarded as CSI 724 to RIC 730. RIC 730 can receive CSI 724 and store CSI 724 along with other channel state information for the antenna array 201 included in network node 104, resulting in aggregated CSI 732. Aggregated CSI 732 can comprise, inter alia, signal strength information indicating strength of a wireless signal received at a first mobile device (UE 1021) from an antenna array at network node 104.

Network node 104 can also send beam patterns 722 to RIC 730. Beam patterns 722 can include beam state information describing beams generated by the antenna array at network node 104. Beam controller 716 can control the antenna array to produce desired beams and beam patterns, and so beam information used by beam controller 716 can be included in beam patterns 722. RIC 730 can receive and store beam patterns 722 in beam patterns data 734. The beam patterns data 734 and the aggregated CSI 732 can optionally be correlated by time, so that CSI 732 at a given time can be correlated with corresponding beam patterns data 734 at the given time.

The beam patterns 734 and CSI 732 can be supplied to beam recovery ML block 736 for analysis. Beam recovery ML block 736 can analyze the aggregated CSI 732 and the beam pattern information 734 to identify recovery beam patterns for the antenna array at network node 104. Recovery beam patterns can be any recovery beam patterns identified by beam recovery ML block 736 as having lower probability of wireless communication failures between network node 104 and UEs 102, in comparison to other beam patterns for the antenna array. Recovery beam patterns and optionally other recovery beam information can be sent as recovery beams 726 to network node 104.

In an example analysis by beam recovery ML block 736, beam recovery ML block 736 can identify, e.g., in CSI 732, failure position information comprising positions of mobile devices during failures of wireless communication between the mobile devices and the antenna array at network node 104. Beam recovery ML block 736 can identify recovery beam patterns for the antenna array by analyzing the failure position information and identifying recovery beam patterns that address/alleviate signal reception problems at the failure positions.

Network node 104 can optionally store recovery beams 726 in recovery beams 712. In response to a wireless communication failure at network node 104, the beam controller 716 can switch its antenna array to a recovery beam or recovery beam pattern stored in recovery beams 712. Alternatively, RIC 730 can send recovery instructions 728 to network node 104 in response to a wireless communication failure. Beam controller 716 can switch its antenna array to a recovery beam or recovery beam pattern identified, e.g., in recovery instructions 728.

Figure 8:
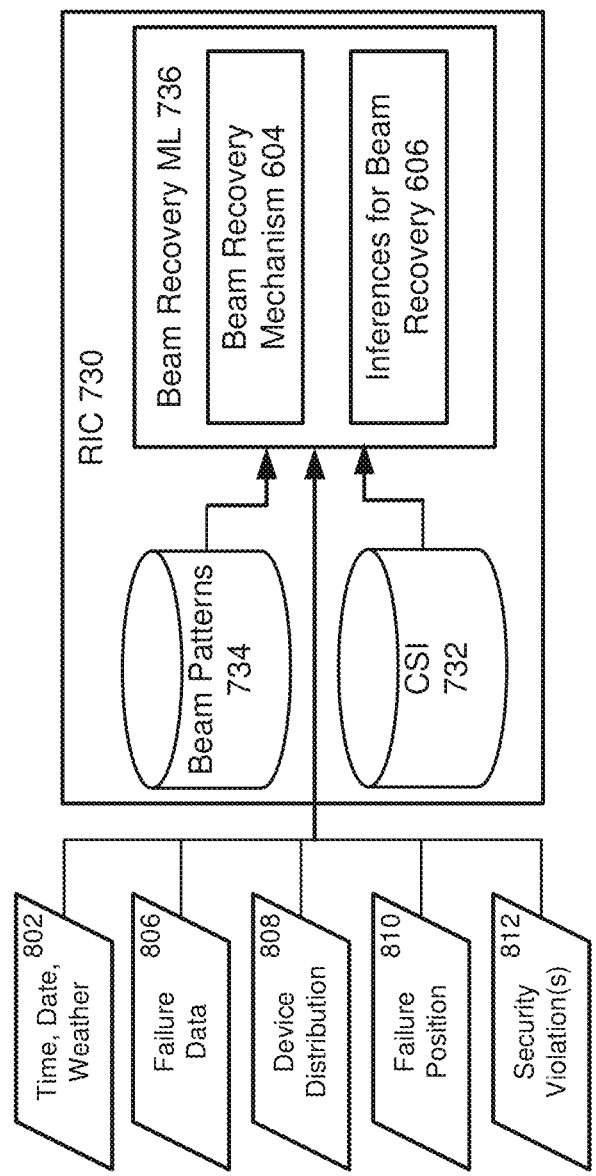
FIG. 8 is a block diagram illustrating example additional data sources which can be used to identify recovery beams, in accordance with various aspects and implementations of the subject disclosure.

In some embodiments, beam recovery ML block 736 can periodically or continuously adjust a recovery beam pattern for network node 104, based on, e.g., real-time CSI, real-time beam patterns, and other data such as weather, failure type, device distribution and security violations, described further in connection with FIG. 8. In response to a failure, RIC 730 can provide recovery instructions 728 including a current recovery beam pattern.

In some embodiments, beam recovery ML block 736 can identify one recovery beam pattern for network node 104, for use in all circumstances, and the recovery beam pattern can be updated as appropriate. In other embodiments, beam recovery ML block 736 can identify multiple recovery beam patterns for the antenna array at network node 104, for use in various different circumstances, and either network node 104 or RIC 730 can use a selection criterion to select a recovery beam pattern from among the multiple recovery beam patterns, so that the recovery beam pattern comprises a selected recovery beam pattern.

Example selection criteria can include, e.g., a spatial distribution of mobile devices, such as UEs 102, in wireless communication with the antenna array at network node 104; CSI for mobile devices, such as UEs 102, in wireless communication with the antenna array at network node 104; a position of a mobile device, e.g., UE 1022 associated with the wireless communication failure; a position of a mobile device, e.g., UE 1022 associated with a security violation, in which case the selected recovery beam pattern can comprise an attenuated signal strength at the position of UE 1022; prevailing weather information; date information; time information; and a failure type of the wireless communication failure. Different recovery beam patterns can be appropriate under different conditions, and so the selection criteria can be used to select a most appropriate recovery beam pattern in view of circumstances at network node 104.

In summary, with regard to FIG. 7, recovery beam patterns and/or recovery beam parameters can be identified at RIC 730. In response to an identification of a wireless communication failure at an antenna array at network node 104, which failure can be a predicted failure or an historical failure, the antenna array at network node 104 can be switched to a recovery beam pattern or can otherwise implement recovery beam parameters identified at RIC 730. As described in connection with FIG. 3, the recovery beam pattern comprises a beam pattern produced by constructive and destructive interference of wireless communication signals generated by multiple antenna elements of the antenna array, the recovery beam pattern is predetermined for the antenna array by analyzing aggregated channel state information and beam pattern information for the antenna array, and the recovery beam pattern has a reduced probability of wireless communication failures in comparison to other beam patterns for the antenna array.

FIG. 8 is a block diagram illustrating example additional data sources which can be used to identify recovery beams, in accordance with various aspects and implementations of the subject disclosure. Repetitive description of like elements employed in other embodiments described herein is omitted for sake of brevity. FIG. 8 includes RIC 730, introduced in FIG. 7, and comprising beam recovery ML 736, beam patterns 734, and CSI 732. Beam recovery ML 736 includes beam recovery mechanism 604 and inferences for beam recovery 606, as illustrated in FIG. 6. FIG. 8 furthermore includes various example additional data sources, comprising: time, date, and weather 802, failure data 806, device distribution 808, failure position 810, and security violation(s) 812.

Different recovery beams may be appropriate under different circumstances. For example, some network nodes can experience common device distributions (of UEs served by the network node), which can occur regularly at different times of day. By defining recovery beam patterns that are appropriate for these device distributions or times of day, and then selecting a recovery beam pattern based on a current device distribution or time of day, a more appropriate recovery beam pattern, that is, a recovery beam pattern which restores service to as many UEs as possible as fast as possible, can be selected. To this end, beam recovery ML 736 can use data sources 802, 806, 808, 810, and 812 both to identify recovery beam patterns, and to select a recovery beam pattern in response to a given wireless communication failure.

Time, date and weather data 802 can comprise, e.g., time of day, day of week, day of month, and holiday information, as well as weather data such as temperature, wind speed and direction, and precipitation information. Failure data 806 can comprise, e.g., a failure type and optionally any additional failure data such as type of UE involved and other state information pertaining to the failure. Device distribution 808 can comprise, e.g., position information for the UEs in communication with an antenna array. Failure position 810 can comprise, e.g., a position of a UE (or of multiple UEs) for which the failure occurred. Security violation(s) 812 can comprise, e.g., an identification of a security violation and type of violation, along with any other information such as an identification of the UE involved in the violation and the position of the UE.

Figure 9:
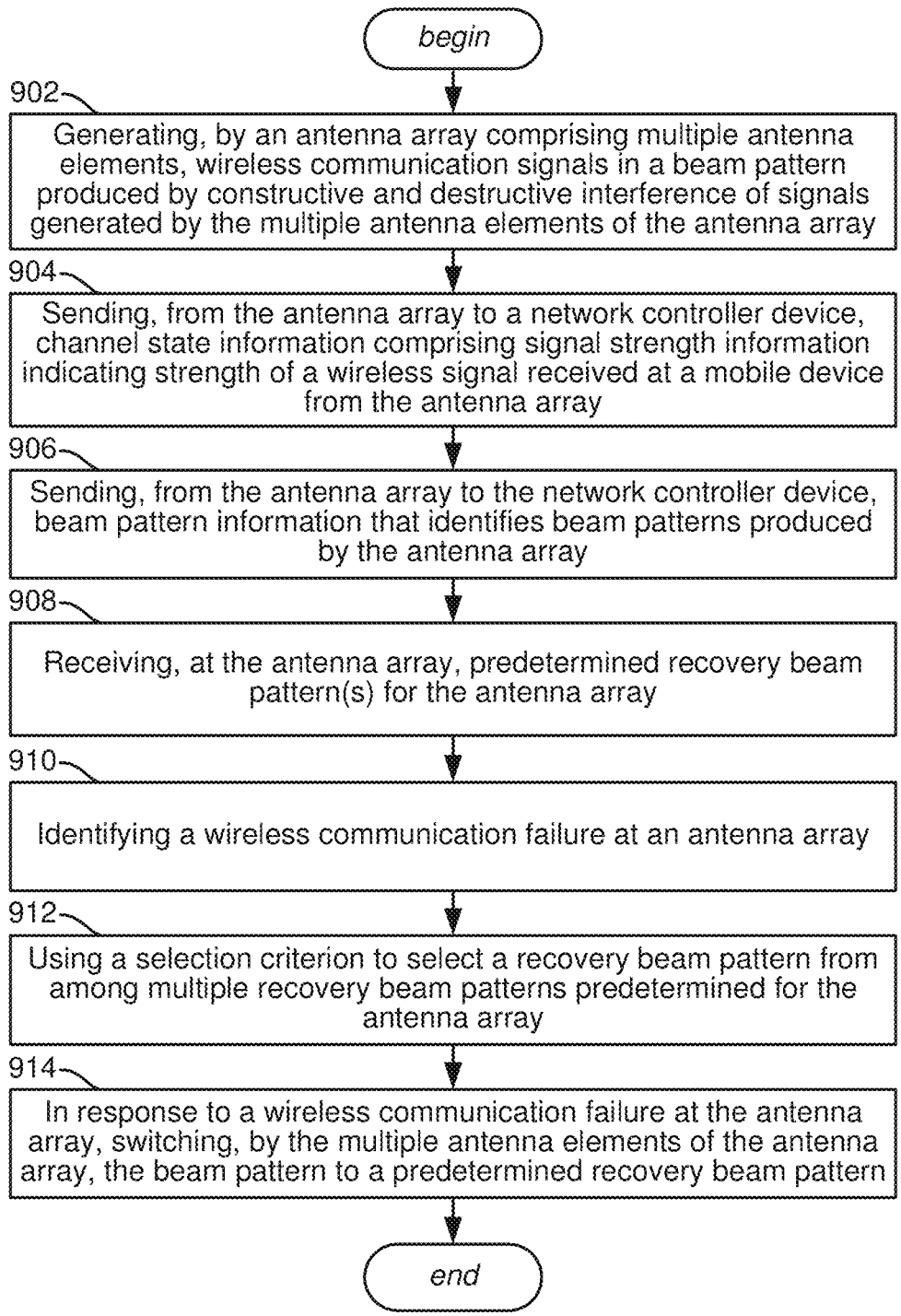
FIG. 9 is a flow diagram representing example operations of a network node, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 is a flow diagram representing example operations of a network node, in accordance with various aspects and implementations of the subject disclosure. Repetitive description of like elements employed in other embodiments described herein is omitted for sake of brevity. It will be appreciated that operations illustrated in FIG. 9 can be re-ordered, combined or eliminated in some embodiments.

Example operations comprise operation 902, which represents generating, by an antenna array comprising multiple antenna elements, wireless communication signals in a beam pattern produced by constructive and destructive interference of signals generated by the multiple antenna elements of the antenna array. For example, with reference to FIG. 7, an antenna array at network node 104 can generate beam patterns in connection with providing normal service to UEs 102.

Operation 904 represents sending, from the antenna array to a network controller device, channel state information comprising signal strength information indicating strength of a wireless signal received at a mobile device from the antenna array. For example, with reference to FIG. 7, network node 104 comprising the antenna array can send CSI 724 to RIC 730. CSI 724 can comprise CSI 601, 602, which can include signal strength information indicating strength of wireless signals received at UEs 102 from the antenna array.

Operation 906 represents sending, from the antenna array to the network controller device, beam pattern information that identifies beam patterns produced by the antenna array. For example, with reference to FIG. 7, network node 104 comprising the antenna array can send beam patterns 722 to RIC 730. The CSI 724 sent at block 904 and the beam pattern information 722 sent at block 906 can be optionally aggregated into CSI 732 and beam patterns 734, and analyzed at RIC 730 to identify predetermined recovery beam pattern(s) for the antenna array at network node 104. The predetermined recovery beam pattern(s) can have lower probability of wireless communication failures, e.g., failures of communications between network node 104 and UEs 102 upon recovery of network node 104, with respect to, e.g., a random beam pattern or a default beam pattern which is not produced through analysis of CSI 732 and beam patterns 734.

Operation 908 represents receiving, at the antenna array, predetermined recovery beam pattern(s) for the antenna array. For example, with reference to FIG. 7, network node 104 comprising the antenna array can receive recovery beam pattern(s) from RIC 730. In some instances, a recovery beam pattern can be received in response to a failure, e.g., by re-ordering blocks 908 and 910. In some instances, recovery beam pattern(s) can be received in advance and stored at network node for later selection in response to a failure.

Operation 910 represents identifying a wireless communication failure at an antenna array. For example, with reference to FIG. 7, network node 104 comprising the antenna array and/or RIC 730 can identify that a failure either has occurred or that a failure is predicted.

Operation 912 represents using a selection criterion to select a recovery beam pattern from among multiple recovery beam patterns predetermined for the antenna array. For example, with reference to FIG. 7, in embodiments wherein multiple recovery beam patterns are defined for use in different circumstances, network node 104 and/or RIC 730 can use a selection criterion, discussed in connection with FIG. 8, to select a recovery beam pattern from among multiple recovery beam patterns predetermined for the antenna array. The selection criterion can comprise, e.g., a criterion based on current conditions at network node 104, such as an evaluation of at least one of: a spatial distribution of mobile devices in wireless communication with the antenna array, channel state information for a first mobile device in wireless communication with the antenna array, a first position of a second mobile device experiencing the wireless communication failure in wireless communication with the antenna array, a second position of a third mobile device associated with a security violation, prevailing weather information, date information, time information, or a failure type of the wireless communication failure.

Operation 914 represents, in response to a wireless communication failure at the antenna array, switching, by the multiple antenna elements of the antenna array, the beam pattern to a predetermined recovery beam pattern. For example, with reference to FIG. 7, in response to a wireless communication failure at the antenna array at network node 104, the network node 104 can employ beam controller 716 to switch the multiple antenna elements of the antenna array to a predetermined recovery beam pattern. The predetermined recovery beam pattern can be, e.g., a pattern selected at block 912, or a pattern received from RIC 730 in real time or near real time.

Figure 10:
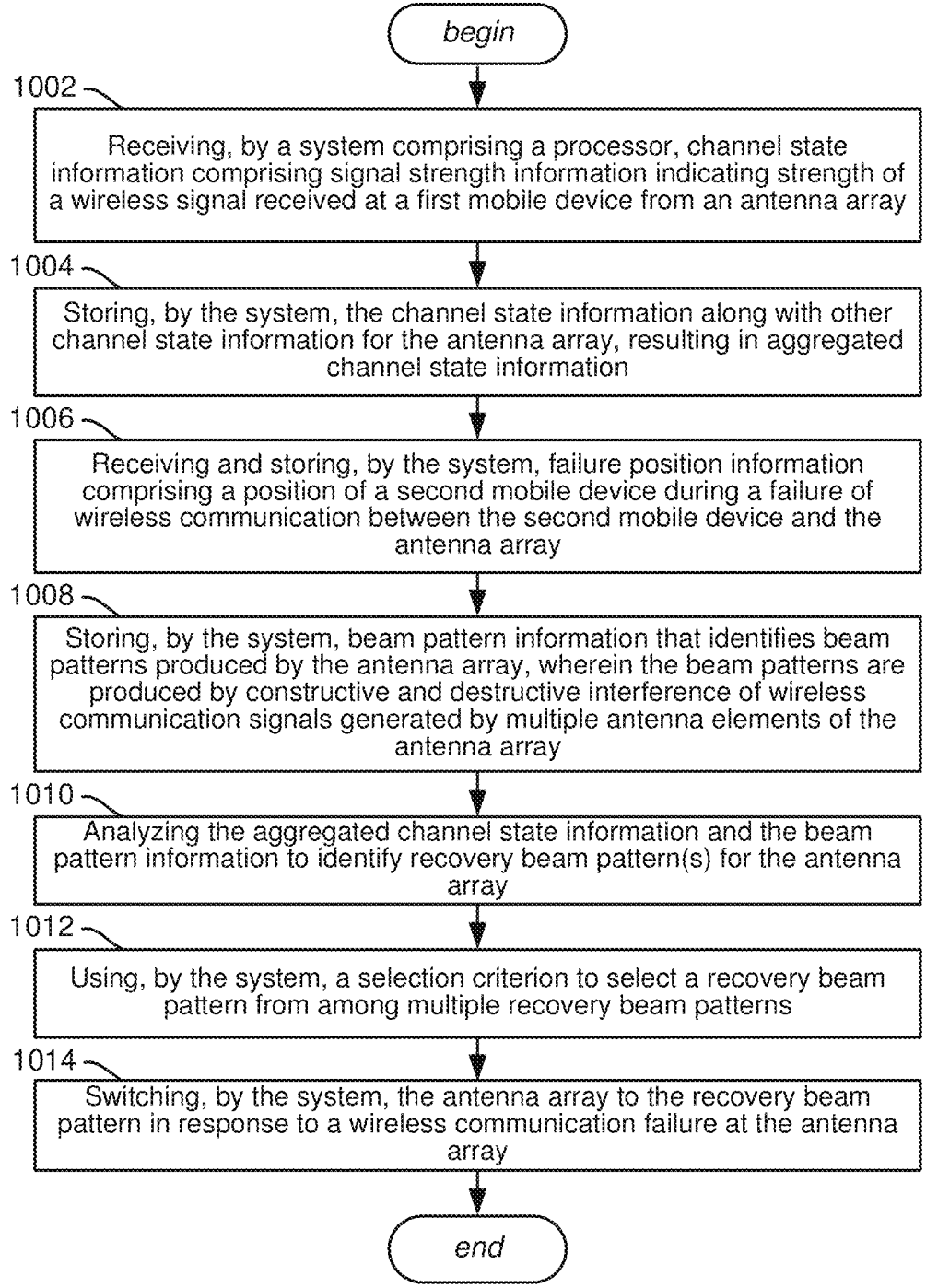
FIG. 10 is a flow diagram representing example operations of a radio access network intelligent controller device, in accordance with various aspects and implementations of the subject disclosure.

One or more aspects, such as implemented in a machine-readable storage medium, comprising executable instructions that, when executed by a processor, facilitate performance of operations, are represented in FIG. 10. FIG. 10 is a flow diagram representing example operations of a radio access network intelligent controller device, in accordance with various aspects and implementations of the subject disclosure. Repetitive description of like elements employed in other embodiments described herein is omitted for sake of brevity. It will be appreciated that operations illustrated in FIG. 10 can be re-ordered, combined or eliminated in some embodiments.

Example operations comprise operation 1002, which represents receiving, by a system comprising a processor, channel state information comprising signal strength information indicating strength of a wireless signal received at a first mobile device from an antenna array. For example, with reference to FIG. 7, RIC 730 can receive CSI 724 comprising at least signal strength information indicating strength of a wireless signal received at UE 1021 from an antenna array at network node 104.

Operation 1004 represents storing, by the system, the channel state information along with other channel state information for the antenna array, resulting in aggregated channel state information. For example, with reference to FIG. 7, RIC 730 can store CSI 724 with CSI 732, resulting in aggregated CSI 732.

Operation 1006 represents receiving and storing, by the system, failure position information comprising a position of a second mobile device during a failure of wireless communication between the second mobile device and the antenna array. For example, with reference to FIG. 7, after collection of CSI data from UEs 102 at blocks 1002 and 104, other UEs can move into range of the network node 104, and such other UEs, or second mobile devices, may experience failures. RIC 730 can optionally receive and store failure position information comprising positions of the second mobile device, during failures of wireless communication between the second mobile devices and the antenna array at network node 104. In some embodiments, analyzing the aggregated CSI 732 and the beam pattern information 734 to identify recovery beam patterns at block 1010 can comprises analyzing the failure position information.

Operation 1008 represents storing, by the system, beam pattern information that identifies beam patterns produced by the antenna array, wherein the beam patterns are produced by constructive and destructive interference of wireless communication signals generated by multiple antenna elements of the antenna array. For example, with reference to FIG. 7, RIC 730 can store beam pattern information 722 that identifies beam patterns produced by the antenna array at network node 104.

Operation 1010 represents analyzing the aggregated channel state information and the beam pattern information to identify recovery beam pattern(s) for the antenna array. For example, with reference to FIG. 7, recovery beam ML 736 can analyze CSI 732 and beam patterns 734 to identify recovery beam pattern(s) for the antenna array at network node 104. In some embodiments, the identified recovery beam pattern(s) can have reduced probability of wireless communication failures in comparison to at least one other beam pattern for the antenna array.

Operation 1012 represents using, by the system, a selection criterion to select a recovery beam pattern from among multiple recovery beam patterns. For example, with reference to FIG. 7, upon identification of a wireless communication failure, RIC 730 or network node 104 can use any of the various selection criteria described herein, or combinations thereof, to select a recovery beam pattern which is suited for conditions at the antenna array.

Operation 1014 represents switching, by the system, the antenna array to the recovery beam pattern in response to a wireless communication failure at the antenna array. For example, with reference to FIG. 7, upon identification of a wireless communication failure, RIC 730 or network node 104 can switch the antenna array at network node 104 to a recovery beam pattern defined at RIC 730, such as, e.g., a recovery beam pattern selected at block 1012.

While the operations of FIG. 9 and FIG. 10 are generally described in the context of recovery beam patterns, it should be appreciated that parameters for one or more individual beams can be similarly predetermined and used for beam recovery.

Figure 11:
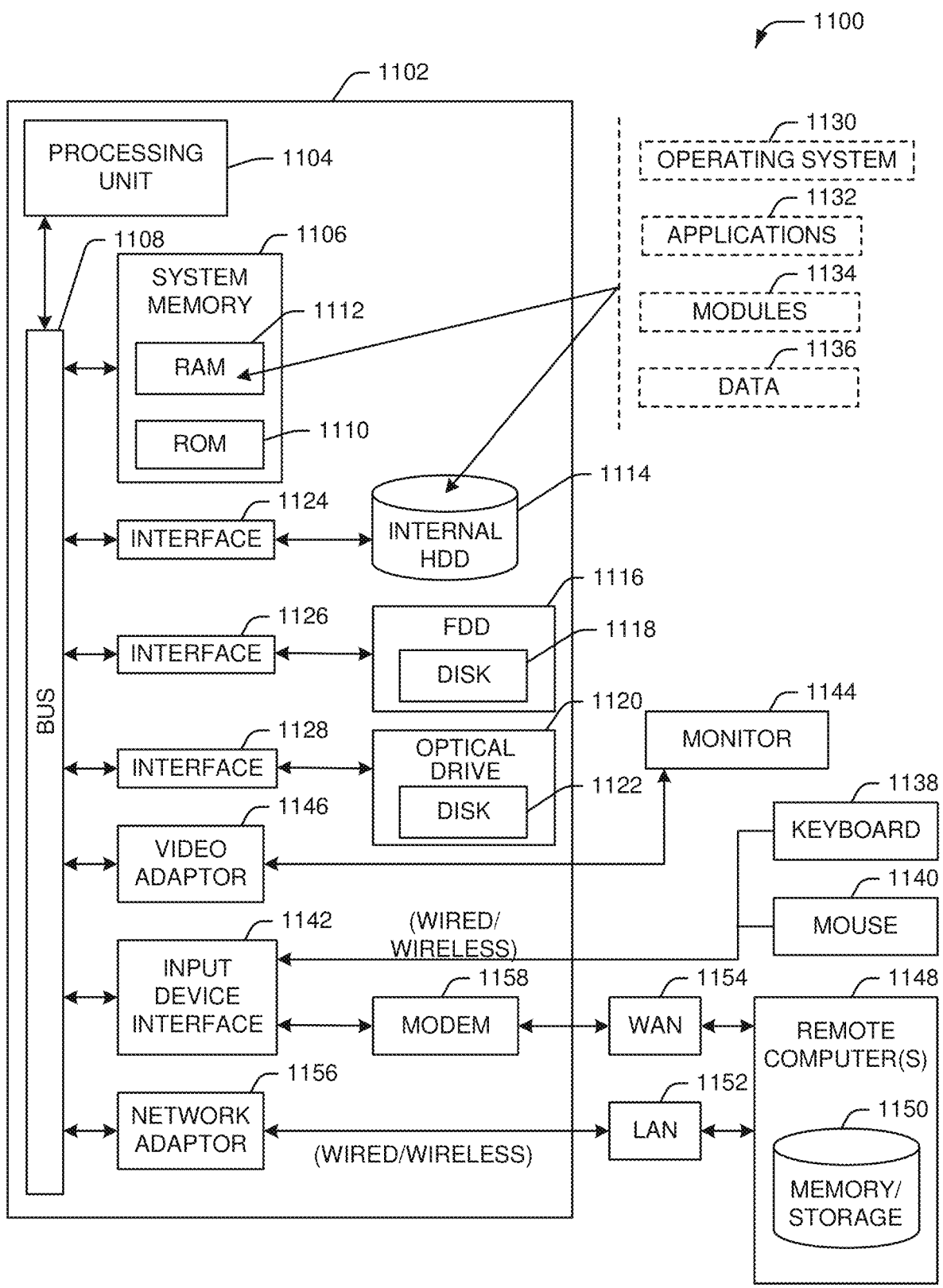
FIG. 11 illustrates a suitable computing environment in which the various aspects of this disclosure can be implemented, in accordance with various aspects and implementations of the subject disclosure.

In order to provide additional context for various embodiments described herein, FIG. 11 and the following discussion are intended to provide a general description of a suitable computing environment 1100 in which the various embodiments of the embodiment described herein can be implemented. The computer 1100 can implement, for example, a RIC 730 or a device at network node 104.

While the embodiments have been described above in the general context of computer-executable instructions that can run on one or more computers, those skilled in the art will recognize that the embodiments can be also implemented in combination with other program modules and/or as a combination of hardware and software. Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1194 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a system comprising a processor, channel state information comprising signal strength information indicating strength of a wireless signal received at first mobile devices from a group of antenna arrays;
    storing, by the system, the channel state information along with other channel state information for the group of antenna arrays, resulting in aggregated channel state information;
    storing, by the system, beam pattern information that identifies beam patterns produced by the group of antenna arrays, wherein the beam patterns are produced by constructive and destructive interference of wireless communication signals generated by multiple antenna elements of the group of antenna arrays;
    analyzing, by the system, the aggregated channel state information and the beam pattern information to pre-calculate, prior to use by antenna arrays of the group of antenna arrays, an atomic set of recovery beam patterns comprising recovery beam patterns for the use by the antenna arrays of the group of antenna arrays in response to a beam failure at the group of antenna arrays, wherein the beam failure comprises a connection disruption between a first mobile device of the first mobile devices and an antenna array of the group of antenna arrays, and wherein respective antenna arrays of the group of antenna arrays use the atomic set of recovery beam patterns by switching to respective recovery beam patterns of the atomic set of recovery beam patterns, followed by entering reactive modes to converge on respective subsequent beam patterns; and
    in response to the beam failure at the group of antenna arrays:
    using, by the system, a selection criterion to select the atomic set of recovery beam patterns from among atomic sets of recovery beam patterns,
    wherein the selection criterion comprises a first criterion related to a position of a second mobile device associated with a security violation, and wherein the atomic set of recovery beam patterns comprises an attenuated signal strength at the position of the second mobile device; and
    facilitating, by the system, switching the group of antenna arrays to the respective recovery beam patterns of the atomic set of recovery beam patterns.

2. The method of claim 1, wherein analyzing the aggregated channel state information and the beam pattern information comprises a machine learning analysis of the aggregated channel state information and the beam pattern information.

3. The method of claim 1, wherein the selection criterion further comprises a second criterion related to a spatial distribution of mobile devices in wireless communication with the group of antenna arrays.

4. The method of claim 1, wherein the selection criterion further comprises a second criterion related to a position of a mobile device associated with the antenna array of the group of antenna arrays.

5. The method of claim 1, wherein the selection criterion further comprises a second criterion related to a position of a mobile device associated with the beam failure.

6. The method of claim 1, wherein the selection criterion further comprises at least one criterion from a group of criteria, the group of criteria comprising a second criterion relating to prevailing weather information, a third criterion relating to date information, and a fourth criterion related to time information.

7. The method of claim 1, wherein analyzing the aggregated channel state information and the beam pattern information to pre-calculate the atomic set of recovery beam patterns is in response to a beam failure inference based on the channel state information.

8. The method of claim 1, wherein the system comprises a radio access network intelligent controller device.

9. The method of claim 1, further comprising receiving and storing, by the system, failure position information comprising the position of the second mobile device during a failure of wireless communication between the second mobile device and the antenna array of the group of antenna arrays, and wherein analyzing the aggregated channel state information and the beam pattern information comprises analyzing the failure position information.

10. A method, comprising:
generating, by an antenna array of a group of antenna arrays, wireless communication signals in a beam pattern produced by constructive and destructive interference of signals generated by multiple antenna elements of the antenna array; and
in response to a beam failure at the group of antenna arrays, the beam failure comprising a connection disruption between a first mobile device and at least one antenna array of the group of antenna arrays, switching, by the multiple antenna elements of the antenna array, the beam pattern to a recovery beam pattern from a pre-calculated atomic set of recovery beam patterns,
wherein the pre-calculated atomic set of recovery beam patterns comprises recovery beam patterns for use by at least some of the antenna arrays of the group of antenna arrays,
wherein the pre-calculated atomic set of recovery beam patterns was selected from among atomic sets of recovery beam patterns using a selection criterion, wherein the selection criterion comprises a criterion related to a position of a second mobile device associated with a security violation, and wherein the pre-calculated atomic set of recovery beam patterns comprises an attenuated signal strength at the position of the second mobile device, and
wherein the antenna array and respective antenna arrays of the group of antenna arrays use the pre-calculated atomic set of recovery beam patterns by switching to respective recovery beam patterns of the pre-calculated atomic set of recovery beam patterns, followed by entering reactive modes no converge on respective subsequent beam patterns.

11. The method of claim 10, further comprising:
sending, from the antenna array to a network controller device, channel state information comprising signal strength information indicating strength of wireless signals received at mobile devices from the antenna array;
sending, from the antenna array to the network controller device, beam pattern information that identifies beam patterns produced by the antenna array,
wherein the channel state information and the beam pattern information are analyzed at the network controller device to identify the pre-calculated atomic set of recovery beam patterns for the group of antenna arrays; and
receiving, at the antenna array, the recovery beam pattern for the antenna array.

12. The method of claim 10, wherein the selection criterion further comprises an evaluation of a spatial distribution of mobile devices in wireless communication with the antenna array.

13. A non-transitory machine-readable storage medium, comprising executable instructions that, when executed by a processor of an antenna array control device, facilitated performance of operations, the operation comprising:
identifying a beam failure at an antenna array, the beam failure comprising a connection disruption between a mobile device and the antenna array;
using a selection criterion to select a pre-calculated recovery beam pattern from among a pre-calculated atomic set of recovery beam patterns;
switching the antenna array to the pre-calculated recovery beam pattern in response to the beam failure at the antenna array, wherein:
the pre-calculated recovery beam pattern comprises a beam pattern produced by constructive and destructive interference of wireless communication signals generated by multiple antenna elements of the antenna array;
the pre-calculated atomic set of recovery beam patterns comprises recovery beam patterns for use by a group of antenna arrays comprising the antenna array;
the pre-calculated atomic set of recovery beam patterns is predetermined for the group of antenna arrays by analyzing aggregated channel state information and beam pattern information for the group of antenna arrays;
the mobile device is associated with a security violation, and the pre-calculated recovery beam pattern comprises a reduced signal strength at a position of the mobile device; and
the pre-calculated recovery beam pattern has a lower probability of wireless communication failures in comparison to at least one other beam pattern for the antenna array; and
subsequent to switching the antenna array to the pre-calculated recovery beam pattern, entering the antenna array into a reactive mode to converge on a subsequent beam pattern.

14. The non-transitory machine-readable storage medium of claim 13, wherein the selection criterion is applicable to a spatial distribution of mobile devices in wireless communication with the antenna array.

15. The non-transitory machine-readable storage medium of claim 13, wherein the position of the mobile device is a first position of a first mobile device, and wherein the selection criterion is applicable to a second position of a second mobile device.

16. The non-transitory machine-readable storage medium of claim 13, wherein the mobile device is associated with a security violation, and wherein the pre-calculated recovery beam pattern comprises a reduced signal strength at a position of the mobile device.

17. The non-transitory machine-readable storage medium of claim 13, wherein analyzing the aggregated channel state information and the beam pattern information comprises a machine learning analysis of the aggregated channel state information and the beam pattern information.

18. The non-transitory machine-readable storage medium of claim 13, wherein the selection criterion is related to channel state information for mobile devices in wireless communication with the antenna array of the group of antenna arrays.

19. The non-transitory machine-readable storage medium of claim 13, wherein the selection criterion comprises at least one criterion from a group of criteria, the group of criteria comprising prevailing weather information, date information, and time information.

20. The non-transitory machine-readable storage medium of claim 19, wherein the antenna array control device comprises a radio access network intelligent controller device.

\* \* \* \* \*